United States Patent
Jensen et al.

(10) Patent No.: US 11,973,371 B2
(45) Date of Patent: Apr. 30, 2024

(54) STATOR FOR A GENERATOR OF A WIND TURBINE, GENERATOR OF A WIND TURBINE, AND WIND TURBINE

(71) Applicant: Siemens Gamesa Renewable Energy A/S, Brande (DK)

(72) Inventors: Simon Vyff Jensen, Tørring (DK); Saravanan Jayaraman, Ikast (DK); Kim Robert Braun Jensen, Silkeborg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 44 days.

(21) Appl. No.: 17/948,963

(22) Filed: Sep. 20, 2022

(65) Prior Publication Data

US 2023/0091420 A1 Mar. 23, 2023

(30) Foreign Application Priority Data

Sep. 22, 2021 (EP) ..................................... 21198289

(51) Int. Cl.
*H02K 1/18* (2006.01)
*F03D 9/25* (2016.01)
(Continued)

(52) U.S. Cl.
CPC ............... *H02K 1/187* (2013.01); *F03D 9/25* (2016.05); *F03D 80/70* (2016.05); *H02K 7/1838* (2013.01);
(Continued)

(58) Field of Classification Search
CPC ........ H02K 1/187; H02K 7/1838; F03D 9/25; F05B 2220/706; F05B 2240/10
See application file for complete search history.

(56) References Cited

U.S. PATENT DOCUMENTS

| 3,395,296 A | * | 7/1968 | Cohen | ..................... F16F 15/10 310/410 |
| 9,425,655 B2 | * | 8/2016 | Calverley | .............. H02K 51/00 |

(Continued)

FOREIGN PATENT DOCUMENTS

| EP | 3672025 A1 * | 6/2020 | ............. H02K 1/185 |
| EP | 3672025 A1 | 6/2020 | |

(Continued)

OTHER PUBLICATIONS

European Search Report dated Mar. 4, 2022 for application No. 21198289.7.

*Primary Examiner* — Pedro J Cuevas
(74) *Attorney, Agent, or Firm* — Schmeiser, Olsen & Watts LLP

(57) ABSTRACT

A stator for a generator of a wind turbine includes stator segments including a lamination stack, and a stator support structure with segments extending in an axial direction and being adjacently located in a circumferential direction to form a ring-like structure, wherein each support structure segment includes at least one longitudinal carrier element, which extends in an axial direction and includes a stator segment-sided lamination attachment section for fixing the carrier element to the respective stator segment using a lamination attachment assembly, wherein the lamination attachment assembly for each carrier element includes:
  a counter bearing element to be inserted into a cavity of the lamination stack and extending at least essentially over the complete axial length of the stator segment,
  a stiffening bar to be placed inside the carrier element on the lamination attachment section, extending at least essentially over the complete axial length of the support structure segment.

13 Claims, 5 Drawing Sheets

(51) Int. Cl.
*F03D 80/70* (2016.01)
*H02K 7/18* (2006.01)

(52) U.S. Cl.
CPC ..... *F05B 2220/706* (2013.01); *F05B 2240/10* (2013.01)

(56) References Cited

U.S. PATENT DOCUMENTS

| | | | | |
|---|---|---|---|---|
| 10,886,797 | B2 * | 1/2021 | Andersen | H02K 7/183 |
| 2011/0121672 | A1 * | 5/2011 | Calverley | H02K 49/102 |
| | | | | 310/216.113 |
| 2011/0266913 | A1 | 11/2011 | Zirin et al. | |
| 2016/0087517 | A1 * | 3/2016 | Powell | H02K 7/1823 |
| | | | | 310/103 |
| 2020/0136442 | A1 * | 4/2020 | Andersen | H02K 7/183 |
| 2023/0081236 | A1 * | 3/2023 | Jensen | H02K 7/1838 |
| | | | | 290/55 |
| 2023/0107708 | A1 * | 4/2023 | Jensen | H02K 1/187 |
| | | | | 290/55 |
| 2023/0213584 | A1 * | 7/2023 | Djukic | G01R 33/072 |
| | | | | 324/765.01 |

FOREIGN PATENT DOCUMENTS

| | | | | |
|---|---|---|---|---|
| EP | 3780344 | A1 | 2/2021 | |
| EP | 3809561 | A1 | 4/2021 | |
| EP | 3863151 | A1 | 8/2021 | |
| EP | 3872964 | A1 * | 9/2021 | ............. F03D 80/00 |
| EP | 4106150 | A1 * | 12/2022 | ............. H02K 1/187 |
| WO | 2018197057 | A1 | 11/2018 | |
| WO | WO-2019102057 | A1 * | 5/2019 | |
| WO | WO-2021170306 | A1 * | 9/2021 | ............. F03D 80/00 |
| WO | WO-2022263070 | A1 * | 12/2022 | ............. H02K 1/187 |

* cited by examiner

STATOR FOR A GENERATOR OF A WIND TURBINE, GENERATOR OF A WIND TURBINE, AND WIND TURBINE

CROSS-REFERENCE TO RELATED APPLICATIONS

This application claims priority to EP Application No. 21198289.7, having a filing date of Sep. 22, 2021, the entire contents of which are hereby incorporated by reference.

FIELD OF TECHNOLOGY

The following concerns a stator for an, in particular direct-drive, generator of a wind turbine, comprising stator segments, which each comprise a lamination stack, and a stator support structure with support structure segments extending in an axial direction and being adjacently located in a circumferential direction to form a ring-like structure, wherein each support structure segment comprises at least one longitudinal carrier element, which extends in an axial direction. The following further concerns a generator having such a stator and a wind turbine having such a generator.

BACKGROUND

To generate electrical power from rotational energy, wind turbines usually comprise a generator having a stator and a rotor. The rotor is coupled to a rotor hub, to which multiple blades are mounted, such that wind energy can be transformed into rotational mechanical energy. The resulting rotation of the rotor hub is transferred to a rotation of the rotor of the generator. In direct-drive wind turbines, no gear box is used, such that the rotation of the rotor hub can be directly used as a rotation of the rotor.

The rotor of the generator comprises magnets, in particular permanent magnets, such that, by rotation of the magnets relative to stator coils formed by stator windings, electrical current is induced in the stator windings. While configurations in which an inner rotor is surrounded by an outer stator have been proposed, usually an outer rotor surrounds an inner stator. For example, a hollow shaft may be connected to the bed frame in the nacelle, to which a stator support structure is mounted, which may comprise two end plates, one on the drive end and one on the non-drive end.

Known stators are often segmented, that is, for reasons of transportability, the lamination stack of the stator is usually divided into stator segments, which each comprise a lamination stack defining stator teeth and carrying the stator windings. In known designs, each of the stator segments, which may, for example, cover an angle interval of 45°, 30°, or even less each, are attached to corresponding support structure segments. These, in turn, can be mounted to the end plates.

The stator support structure of the stator usually not only ensures a defined positioning of the stator segments relative to the magnets of the rotor, but also prevents collisions between the stator and the rotor, in particular taking into account the strong radial and tangential electromagnetic forces generated during operation of the generator. Additionally, the stator support structure prevents the occurrence of coinciding eigenfrequencies of the segmented assembly regarding electromagnetic excitation force frequencies. Finally, the stator support structure has to withstand all load conditions of the generator, also in long term scenarios, that is, during the whole lifetime of the generator.

For fixing the stator segments to the support structure segments, multiple designs have been proposed in the state of the art. For example, welded connections between the lamination stack and the support structure segments are known as well as bolted connections. In the bolted design, to provide enough stiffness, a large amount of material and complex bending of plates as well as complex welds are needed. For example, the support structure segments may comprise at least one carrier element, to which the lamination stack of the stator segments is coupled. For providing sufficient stability, in an attachment section of the carrier element, which is on the stator side, a large surface is required.

A support structure segment for a generator of a wind turbine is disclosed in WO 2018/197057 A1. Here, bended profiles are used as carrier elements. The carrier elements comprise a top section for connection to the lamination stack, at least one side section and at least one base section. In particular, the base section, the side section, the top section, a further side section, and a further base section of the carrier element may describe an omega-type profile. These omega profiles are usually joined by internal and external tangential stiffeners, for example metal plates, which are welded to the profiles. This significantly increases the complexity and the cost of such a support structure segment. Additionally, the extensive amount of welding induces deformation in the support structure, such that high requirements regarding precision result. Regarding the connection between the support structure segment and the stator segment, various approaches have already been proposed.

In most of these approaches, a cavity is provided in an attachment area of the lamination stack. In the cavity, a counter bearing element is placed, which comprises threaded holes into which bolts extending through a lamination attachment section of the carrier elements may be screwed. Exemplary configurations are, for example, described in EP 3 672 025 A1. Here, the cavity may be a groove into which a dove-tail or a halfmoon-shaped counter bearing element (rod) is inserted axially. Since the rod is wider than an opening of the cavity, the counter bearing element cannot be pulled from the cavity in the radial direction. A bolting means, for example a bolt/screw, is used to radially pull the counter bearing element towards the carrier element and therefore fix the stator segment to the support structure segment.

In concrete known designs, a simple bolted joint with a bolt, a washer and a bolt extender is used. A bolt extender may be designed to support the carrier elements and the lamination stack structurally, in particular to provide a better transfer of loads. In this manner, a local support is added to each single bolt joint. However, the thickness of the carrier element, usually, should be chosen as low as possible to require less material and, in some cases, be able to form certain profiles, for example omega profiles. However, the thickness of the carrier element, in particular a lamination attachment section, between the bolt extender and the lamination stack is very critical. If too much material is machined away, local deflections of the carrier element or support structure segment as a whole may lead to the occurrence of cracks.

SUMMARY

An aspect relates to provide an improved approach for coupling support structure segments to stator segments, in particular allowing higher stability and cheaper production.

In a stator as initially described, wherein each carrier element comprises a stator segment-sided lamination attachment section having through holes for lamination bolting means, in particular bolts and/or bolt extenders, for fixing the carrier element to the respective stator segment using a lamination attachment assembly, the lamination attachment assembly for each carrier element comprises:

a counter bearing element to be inserted into a cavity of the lamination stack and extending at least essentially over the complete axial length of the stator segment, the counter bearing element comprising threaded holes for receiving the lamination bolting means, a stiffening bar to be placed inside the carrier element on the lamination attachment section, extending at least essentially over the complete axial length of the support structure segment and comprising through holes for the lamination bolting means, and the lamination bolting means bolted through aligned sets of through holes and threaded hole.

A bolting means should be understood as a bolt, a bolt extender or a combination of a bolt and a bolt extender. In particular, a bolting means comprises a threaded portion and a head portion, wherein the threads of the threaded portion of the lamination bolting means, of course, match the threaded hole such that the counter bearing element can be radially pulled towards the carrier element by the bolting means being screwed into the threaded hole. Therefore, the stator segment is fixed to the support structure segment. While it is conceivable that at least one through hole is also threaded, the through holes are not threaded, but only slightly larger than the corresponding lamination bolting means' diameter. In particular, the through hole through a stiffening bar is smaller than a head portion of the lamination bolting means such that the head rests, directly or via a washer, on the surface of the stiffening bar. The carrier element usually is or has a profile defining an inner space, which is delimited at least by the lamination attachment section, such that the stiffening bar rests inside the carrier element.

It is noted that the lamination attachment section, the lamination attachment assembly, and the lamination bolting means have been thus named since, below, also advantageous improvements regarding the segment-to-segment connection will be discussed, resulting in the optional provision of respective segment attachment sections, segment attachment means, and segment bolting means.

It is proposed to implement a stiffening bar, in particular replacing individual bolt extenders for each lamination bolt joint. The stiffening bar extends over the full length of the carrier element and has a through hole for each of the lamination bolting means. Advantageously, the counter bearing element, the stiffening bar, and the lamination bolting means form an at least essentially H-shaped stiffening structure extending at least essentially over the whole axial length of each support structure segment. The full-length stiffening bar adds significant stiffness to the lamination bolt joints. Since all lamination bolting means are structurally connected due to the stiffening bar, the stiffening bar, the bolting means, and the counter bearing element act as a sort of H profile providing a large amount of stiffness.

As the stiffness is improved, the thickness requirement for the machining of the carrier elements, in particular the lamination attachment section, can be decreased since a local reduction in thickness has less influence on the structural integrity, in particular with the H-like profile giving support.

Additionally, the handling in production and the overall cost will be reduced. In particular, there is only one stiffening bar instead of a large number of bolt extenders. With one or two lamination bolting means screwed in, the stiffening bar is in place and the rest of the assembly can be performed faster. Furthermore, it is less costly to produce one standard stiffening bar with through holes than a large number of bolt extenders with holes.

Generally said, the stator, which is used as an inner stator, comprises the lamination stack structure, which is divided into stator segments, each comprising a lamination stack defining stator teeth and carrying stator windings, and the stator support structure, usually formed by the mutually connected support structure segments, which are in turn attached to end plates, as known in the state of the art. Each of the segments may, for example, cover an angle interval of 45°, 30° or less than 30°. The stator support structure, as known in the art, hence allows defined positioning of the stator segments of the lamination stack structure relative to the magnets of the rotor and prevents collisions between the stator and the rotor. In a wind turbine, the stator support structure, in particular the drive end end plate and the non-drive end end plate, can, for example, be mounted on a hollow shaft, which may be connected to a bed frame in a nacelle.

In an embodiment, the stiffening bar may be made of metal, in particular steel. For example, the same material as used for the carrier element may be used. Furthermore, the lamination attachment assembly may further comprise at least one lamination washer for each lamination bolting means and/or a total of 20-30, in particular 24-28, lamination bolting means.

In concrete embodiments, the counter bearing element may be tightly fitted into the cavity. It may, for example on assembly of the stator, be axially introduced into the cavity. Each cavity may, have an opening towards the respective lamination attachment section, the opening having a smaller circumferential extension than the widest circumferential extension of the cavity. The counter bearing element may have a tapered shape towards the lamination attachment section. For example, configurations as described in EP 3 672 025 A1 may be used. For example a half-moon rod may be used as the counter bearing element, being inserted into a correspondingly shaped cavity which has an opening towards the carrier element and, therefore, is a groove. In other embodiments, the counter bearing element may also have a dovetail-like cross section.

In an embodiment, the monolithic carrier element may have a rectangular, hollow profile, wherein access holes are provided for each lamination bolting means in an access section opposite the lamination attachment section. In this case, one-piece rectangular profiles are used, which are extremely stable, provide large surfaces with the lamination attachment section and are readily commercially available, that is, cost can be further reduced. Standard known rectangular profiles may be cut in length to yield stable carrier elements.

It should be noted at this point that, in most embodiments, the support structure segment will include more than one carrier element, since stator segments and, analogously, support structure segments usually span an angular interval of, for example, 30° to 60° in a circumferential direction. For example, a support structure segment may comprise three to seven carrier elements or even more carrier elements. The carrier elements usually at least span an axial length at least between two pressure plates, which are provided to directly or indirectly pressurize the lamination stack (stack of lamination sheets) and extend in the circumferential direction. These pressure plates, to which the carrier elements are usually fixed, for example by welding, may already act as a lateral stiffener, improving the stability of the whole support structure segment.

Generally, the directions mentioned in this description refer to the generator and its rotational axis. An axial direction is parallel to the rotational axis of the generator, a radial direction is the respective direction to or from the rotational axis perpendicular to the axial direction and the circumferential direction is perpendicular to both radial direction and axial direction.

As already mentioned, the support structure segment comprises pressure plates at each axial end of the support structure segment, wherein the at least one carrier element may extend beyond the respective pressure plates in the axial direction. In this manner, as in principle known from the art, the extended carrier element is adapted to carry the whole stator segment, in particular also an overhang, independent of the distance between the pressure plates.

The support structure segments, are, as known from the art, connected to each other in a circumferential direction to form a ring-like structure which may then be mounted to the end plates to provide the complete stator support structure. For attaching two adjacent support structure segments together, approaches described in the state of the art may also be employed in embodiments of the current invention. However, these known designs are lacking stiffness in the segment-to-segment joint. For example, the carrier elements may be made of 10-12 mm thick plates which may be formed to provide desired profiles, for example an omega profile, as already described. In other embodiments, as discussed above, carrier elements may also be made from pre-formed profiles, for example rectangular profiles, having such a thickness. To reach a stiffness matching the requirements, thicker material would be required in corresponding segment attachment sections. To compensate for the lack of stiffness in known approaches, different grips and connector plates have been added to the carrier elements. However, such solutions are not very effective and provide a poor ratio of cost/material compared with the benefit in stiffness.

In view of these problems, a particularly exemplary embodiment of the current invention, wherein at least one carrier element at a circumferential side of support structure segment comprises a segment attachment section having through holes for segment bolting means, in particular a bolt and/or a bolt extender, for fixing the segment attachment section to a respective segment attachment section of a circumferentially adjacent support structure segment using a segment attachment assembly, proposes that the segment attachment assembly for each segment-to-segment connection comprises:
  a stiffening plate placed between the two segment attachment sections, extending at least essentially over the complete axial length of the support structure segments and comprising through holes for the segment bolting means,
  the segment bolting means bolted through aligned sets of through holes, and
  nuts fixating the segment bolting means on the non-stiffening plate side of the segment attachment section opposite the segment attachment section against which a head portion of the segment bolting means rests.

It is hence proposed to add a structural stiffening plate between the two segment attachment sections as a part of the bolted joint in the segment-to-segment connection. Since multiple bolts, for example 4 to 10, in particular 6 or 7, segment bolting means are used, which all act to fix the same stiffening plate, the stiffness in the area is significantly increased. In particular, the stiffening plate mounted in the segment-to-segment connection can be designed to exactly provide the required stiffness which would be lacking due to a small thickness of the segment attachment segments of the carrier elements. In other words, the stiffening plate can be thicker or thinner, depending on the structural requirements. All other areas of the support structure segment do not need stiffening beyond what is provided by the profiles of the carrier elements, such that all carrier elements over the circumferential extension of the support structure segment may be manufactured having the same thickness. Regarding the segment-to-segment connection, where stiffness is lacking, additional stiffness is provided using the stiffening plate. The addition of material to other areas of the support structure segment can be prevented.

It is noted that the use of such a stiffening plate is also advantageous independently from the stiffening bar proposed regarding the lamination attachment assembly. In other words, a stator support structure for a stator of an, in particular direct-drive, generator of a wind turbine is conceivable, comprising two end plates and a ring of support structure segments, each support structure segment comprising at least one longitudinal carrier element, which extends in a axial direction and comprises a stator-sided attachment section for fixing the carrier element to a stator segment of the stator, wherein, at each circumferential side of the support structure segment, a respective carrier element comprises a segment attachment section having through holes for segment bolting means, in particular a bolt and/or a bolt extender, for fixing the segment attachment section to a respective segment attachment section of a circumferentially adjacent support structure segment using a segment attachment assembly, wherein the segment attachment assembly for each segment-to-segment connection comprises:
  a stiffening plate placed between the two segment attachment sections, extending at least essentially over the complete axial length of the support structure segments and comprising through holes for the segment bolting means,
  the segment bolting means bolted through aligned sets of through holes, and
  nuts fixating the segment bolting means on the non-stiffening plate side of the segment attachment section opposite the segment attachment section against which a head portion of the segment bolting means rests. Also in this case, the monolithic carrier element may have a rectangular, hollow profile.

In an especially exemplary embodiment regarding the segment-to-segment connection, the segment attachment assembly may further comprise a bushing enclosing the segment bolting means as a spacer between the stiffening plate, which is directly or indirectly, in particular via a washer, abutting the surface of one of the segment attachment sections, and the other segment attachment section, wherein the bushing is screwed into the threaded through hole of the stiffening plate to adjust to the distance between the two support structure segments. The segment attachment assembly may hence further comprise a bushing, which may also act as a spacer, since the segment-to-segment distance may vary. According to this embodiment, the bushing also acting as an adjustable spacer is not screwed into one of the segments, but into the stiffening plate, in this manner also ensuring that the stiffening plate is acting in the segment-to-segment joint. This is achieved by mounting the bushing in a thread in the stiffening plate, such that, before tightening of the segment bolting means, the bushing may be screwed towards the opposing support structure segment to eliminate the gap between the two segments. Since the bushing contacts the stiffening plate and one of the segment attachment sections, all loads will go through the stiffening plate, enabling its function.

As already mentioned, since the stiffening plate is provided, the thickness of the material in the segment attachment sections does not need to be increased, such that, in particular, the segment attachment section may have a material thickness equal to the material thickness of the rest of the carrier element. In particular, each carrier element along the circumferential direction of the support structure segment, be it an end carrier element or not, may be similar or even equal.

In an embodiment, at least one access opening may be provided in a section of the carrier element opposite to the segment attachment section. Analogously to the access holes regarding the lamination attachment assembly, access openings may also be provided regarding the segment attachment assembly.

As already discussed regarding the lamination attachment assembly, also regarding the segment attachment assembly, of course, washers and/or other additional components may be provided. In some embodiments, it may be advantageous to use a combination of bolt extender and bolt to provide further stiffening at the inside of a carrier element.

Embodiments of the invention further concern a wind turbine generator comprising a stator according to embodiments of the invention. Furthermore, a wind turbine according to embodiments of the invention comprises a generator according to the invention. In an embodiment, such a generator is a direct-drive generator having an inner stator according to embodiments of the invention and an outer rotor. As discussed above, the stator support structure may also comprise two end plates to which the ring of stator support segments is attached, which may, for example, be mounted to a hollow shaft, which, in turn, may be mounted to a bedframe of a nacelle. The stator generally further comprises the stator segments as well as the corresponding stator windings. All features and remarks regarding the stator may be accordingly applied to the wind turbine generator and the wind turbine according to embodiments of the invention.

BRIEF DESCRIPTION

Some of the embodiments will be described in detail, with reference to the following figures, wherein like designations denote like members, wherein.

DETAILED DESCRIPTION

Figure 1:
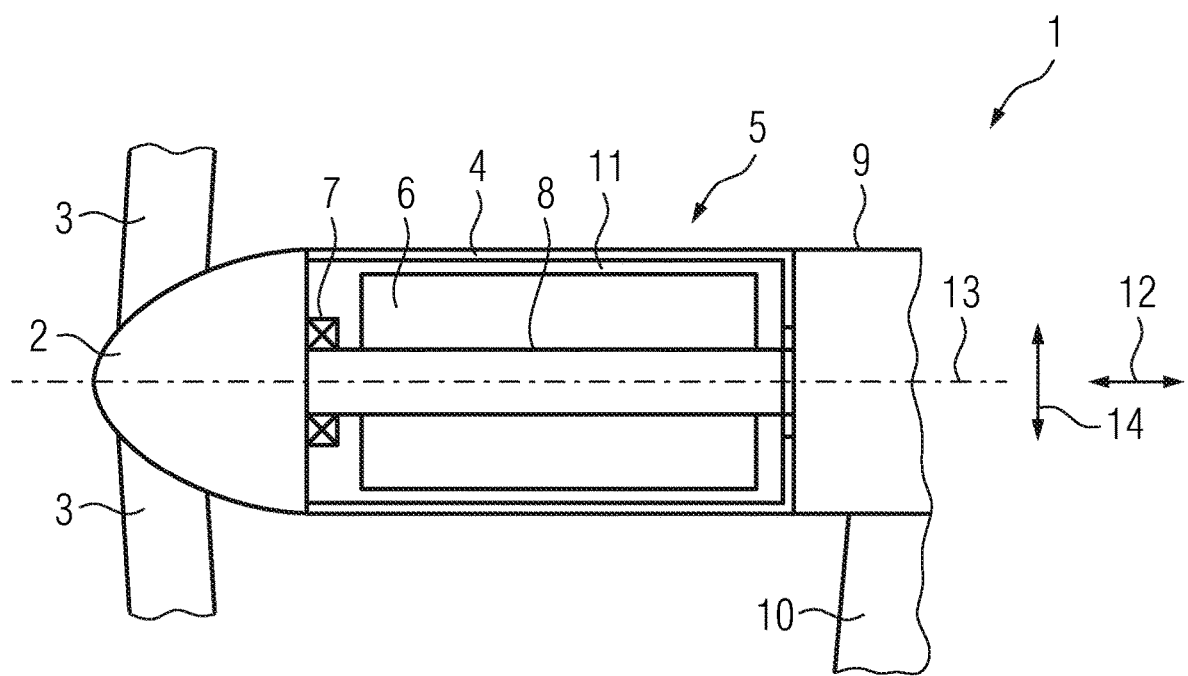
FIG. 1 shows a schematical sectional view of a wind turbine according to the invention.

FIG. 1 is a principle drawing of a wind turbine 1 according to embodiments of the invention. The wind turbine 1 is a direct-drive wind turbine which can be used in onshore as well as in offshore applications. The wind turbine 1 comprises a rotor hub 2 to which multiple rotor blades 3, for example three blades 3, are mounted. The rotational movement of the rotor hub 2 generated by wind blades 3 is directly transferred to a rotor 4 of a generator 5, wherein the rotor 4 comprises at least one permanent magnet (not shown in FIG. 1) and is rotatable against a stator 6 according to embodiments of the invention via a bearing 7 on a hollow shaft 8. The hollow shaft 8 is continued into a nacelle 9, which is mounted on a tower 10 only indicated in FIG. 1. The hollow shaft 8 may be mounted to a bedframe of the nacelle 9.

In the depicted embodiment, an inner stator 6-outer rotor 4 configuration is used, wherein the stator 6 and the rotor 4 are distanced radially by an air gap 11. The axial direction 12 along the rotational axis 13 as well as the radial direction 14 are indicated in FIG. 1.

Figure 2:
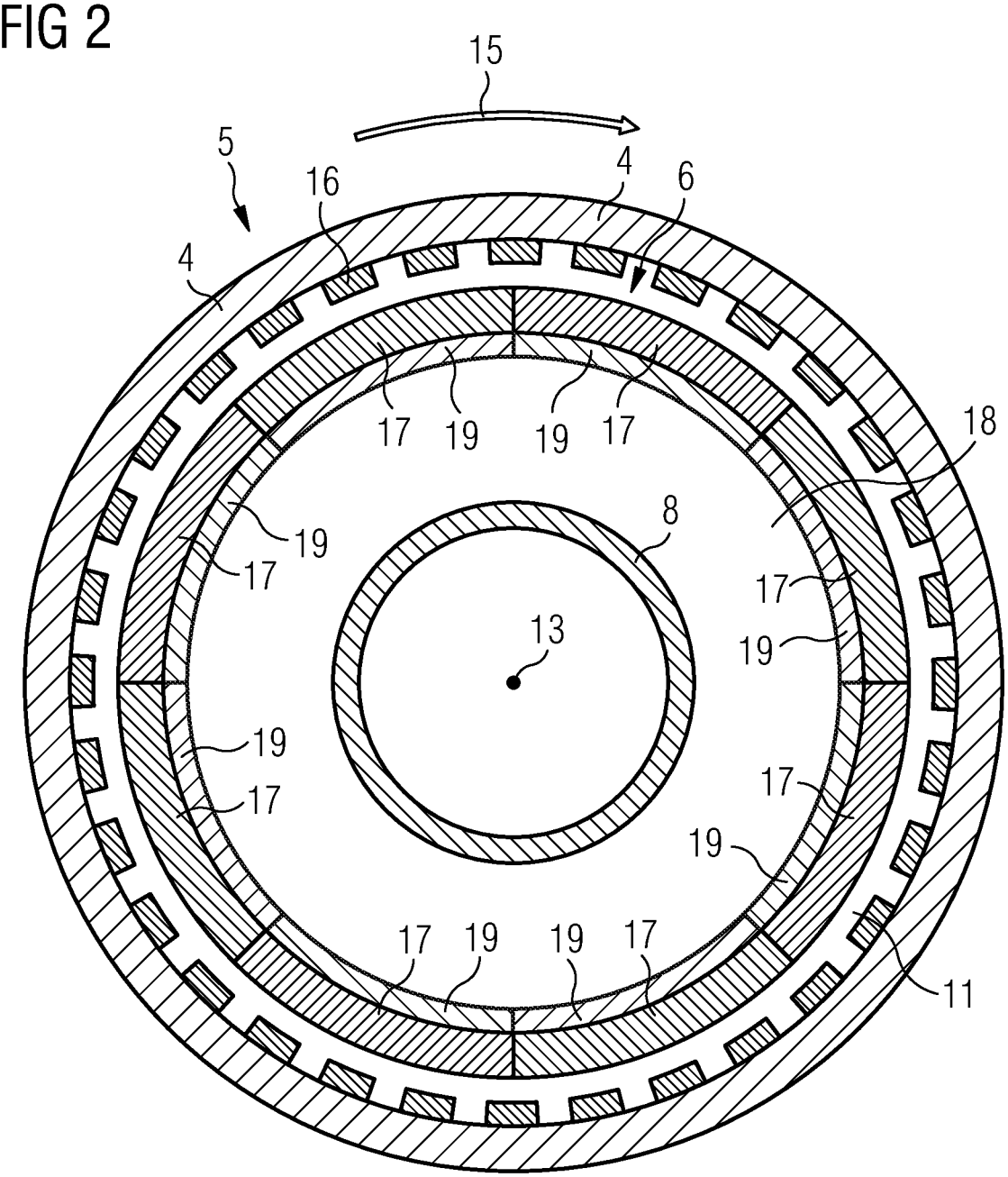
FIG. 2 shows a schematical sectional view of the generator of the wind turbine of FIG. 1.

In FIG. 2, a schematical sectional view of the generator 5 is shown, wherein the circumferential direction 15 is also indicated. As can be seen, multiple permanent magnets 16 are arranged on the rotor 4 on a stator-facing side. The stator 6 comprises multiple stator segments 17, each in turn comprising a lamination stack, that is, the stack of lamination sheets, to which the stator windings forming the stator coils are mounted. In this example, eight stator segments 17 are used. The stator windings do face the permanent magnets 16 via the air gap 11, such that upon movement of the rotor 4 with respect to the stator 5, electrical current is induced into stator coils formed by the stator windings.

The stator 6 is mounted on the hollow shaft 8 via a stator support structure 18, which comprises end plates (not shown) on the non-drive end side and on the drive end side. Each stator segment 17 is supported on a separate support structure segment 19. The support structure segments 19 are coupled to the stator segments 17 by lamination attachment means, while the support structure segments 19 are coupled to each other by segment attachment assemblies, as further detailed below with respect to FIGS. 4 and 5.

Figure 3:
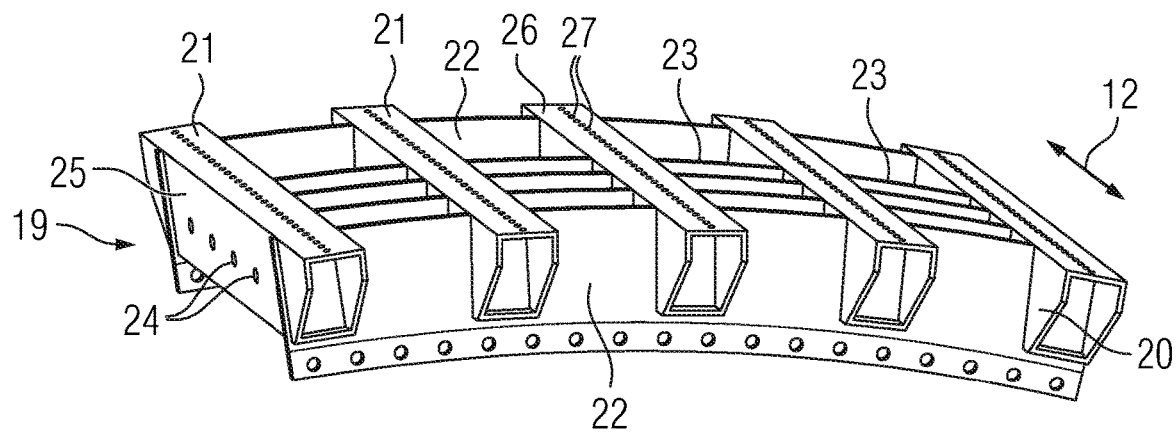
FIG. 3 shows a respective upper view of a support structure element.

FIG. 3 shows an embodiment of a support structure segment 19, which comprises multiple carrier elements 21 extending in the axial direction 12. The carrier elements are, in this example, made from monolithic rectangular hollow metal profiles and are connected, in this case welded, due to pressure plates 22 at the axial ends of the support structure segment 19 and to stabilization plates 23 acting as lateral stiffeners. As can be seen, the carrier elements 21 protrude over the pressure plates 22 forming a protruding portion 20, which may also be called overhang portions.

The support structure segment 19 further comprises through holes 24 on at least one circumferential side surface 25 of the support structure segment 19 for connecting adjacent support structure segments 19 in a manner shown below. On top of the carrier elements 21, in a stator-sided lamination attachment section 26 of each carrier element 21, through holes 27 are provided for lamination bolting means fixing the stator segment 17, in particular its lamination stack, to the respective carrier element 21.

Figure 4:
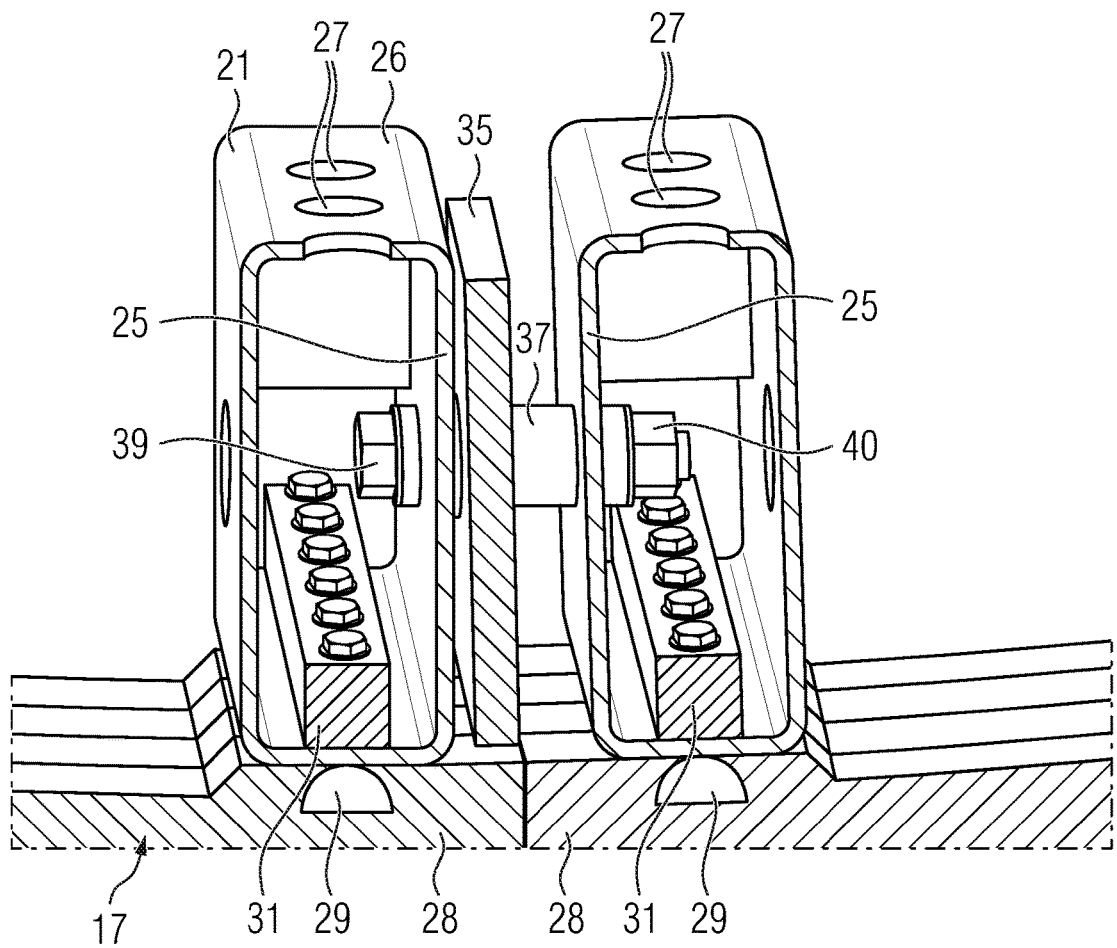
FIG. 4 shows a schematical, partially cut view onto an area of a segment-to-segment connection.
Figure 5:
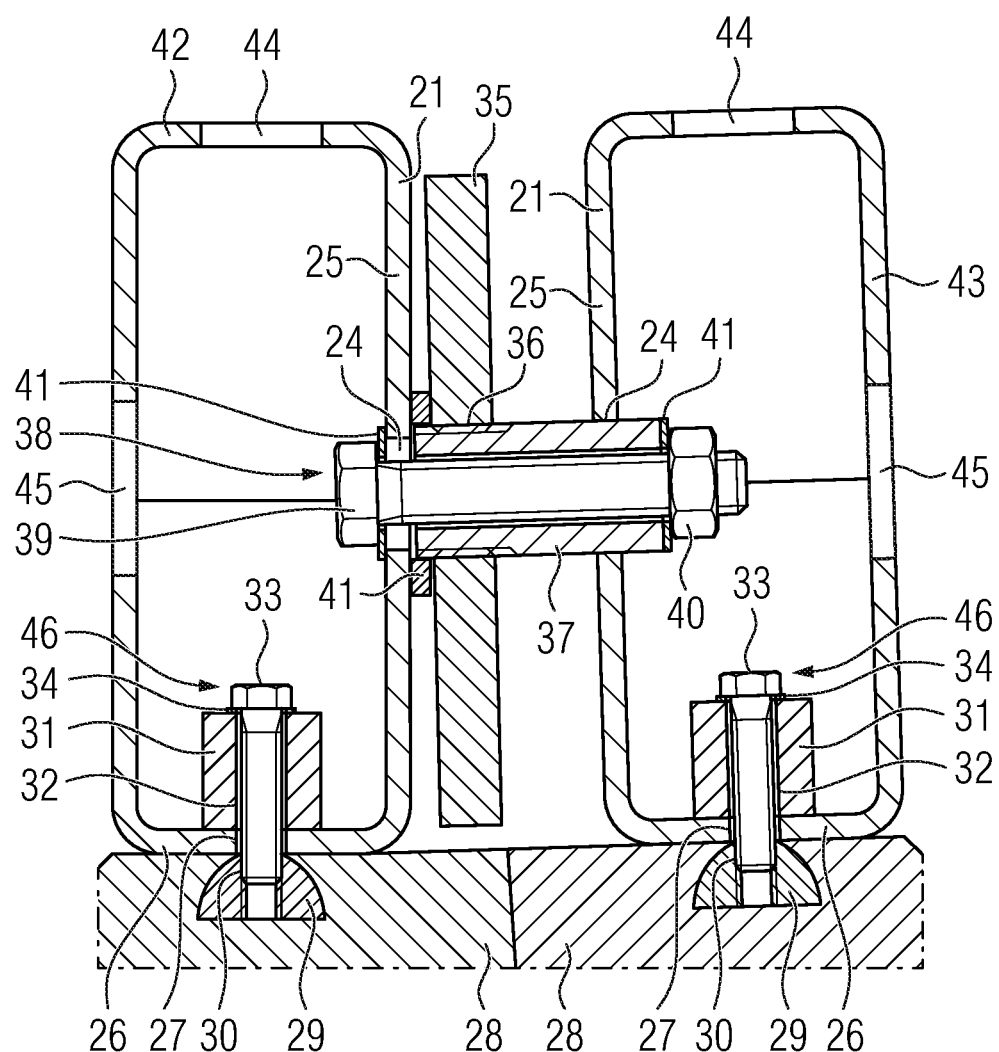
FIG. 5 shows a cross-sectional view in the area of FIG. 4.

This connection as well as the segment-to-segment connection are shown in detail in FIGS. 4 and 5.

Regarding the attachment of the support structure segment 9 to a respective stator segment 17, the stator segment 17 comprises, in its lamination stack 28, a cavity, in this case a groove, with an opening towards the radially inner side. In the cavity, a counter bearing element 29, in this case a half-moon rod, has been inserted axially. The half-moon rod comprises threaded holes 30, which are aligned with through holes 27 of the lamination attachment section 26 of the carrier elements 21. On the radially inner side of the lamination attachment section 26, a stiffening bar 31 is placed, which extends over the whole axial side of the carrier element 21. The stiffening bar 31 also has through holes 32 aligned with the through holes 27 and the threaded holes 30.

In this manner, lamination bolting means 46, in this case simple bolts 33, can be inserted through the through holes 32, 27 and screwed into the threaded hole 30 to pull the counter bearing element 29 towards the carrier element 21 and fix the stiffening bar 31 between the head portion of the bolt 33 and the lamination attachment section 26. As the opening of the cavity in the lamination stack 28 is smaller than the circumferential extension of the counter bearing element 29, strong attachment results. As can in particular be seen from FIG. 5, the full-length stiffening bar 31, which can be understood as a sort of "bar bolt extender", adds significant stiffness to the lamination attachment joint. The stiffening bar 31, the counter bearing element 29 and the bolts 33 form an H-like profile, providing large structural stability, in particular stiffness, despite the thickness of the material in the lamination attachment section 26, being equal to the thickness of the material of the whole carrier element 21, has only been chosen to fulfil mechanical stability requirements regarding the carrier element 21. Even a local reduction in thickness can be considered, since, with the H profile giving support, this has less influence on structural integrity. In this embodiment, for example, 24-28 bolts can be used along the axial length of each carrier element 21.

It is noted that, where expedient, washers 34 may be added.

Regarding the segment-to-segment connection, as can be seen, a stiffening plate 35 has been positioned between the two segment attachment sections 25 of the sidemost carrier elements 21, which have the through holes 24. The stiffening plate 35 also provides a through hole 36, which, in this case, is threaded to receive a bushing 37 which also acts as an adjustable spacer, depending on how far it is screwed into the stiffening plate 35. The bushing 37 surrounds a segment bolting means 38, in this case again a bolt 39, extending through the through holes 24 and the inner space of the bushing 37 into the opposite carrier element 21, where it is fastened using a nut 40. Also in this case, of course, washers 41 may be used where sensible, for example as a spacer for the stiffening plate 35, wherein it is also possible to provide the stiffening plate 35 or the segment attachment section 25 with a corresponding protrusion.

Figure 6:
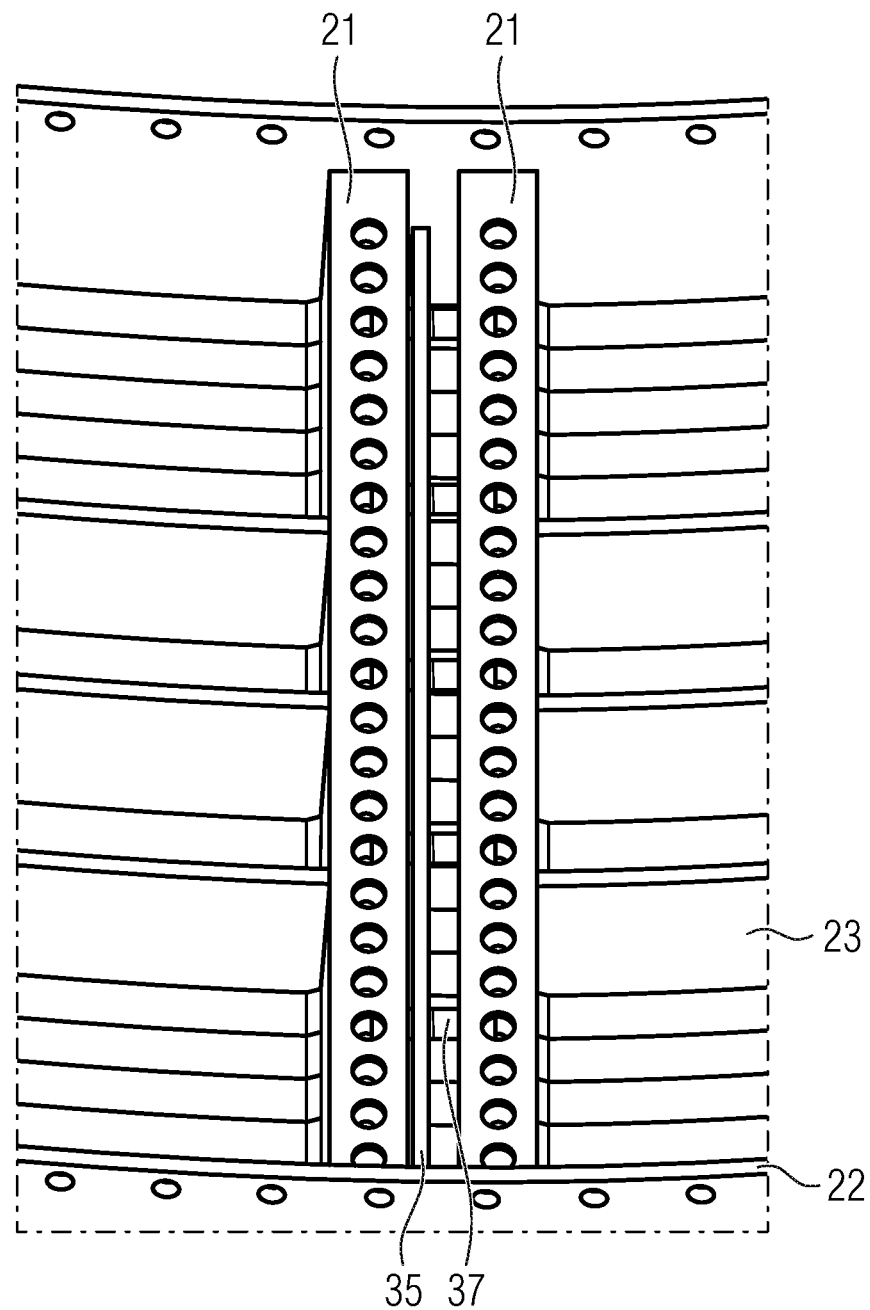
FIG. 6 shows a perspective view onto the segment-to-segment connection.

The stiffening plate 35 also extends over the whole length of the respective carrier elements 21 and hence support structure segments 19, as can be, for example, seen in the perspective view of FIG. 6.

As can be seen in FIG. 5, the sections 42 and 43 opposite the respective attachment sections 25, 26, may provide access holes 44 or access openings 45, respectively, to fasten the bolts 34, 39, using respective tools.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:
1. A stator for a generator of a wind turbine, comprising:
stator segments, which each comprise a lamination stack; and
a stator support structure with support structure segments extending in an axial direction and being adjacently located in a circumferential direction to form a ring-like structure, wherein each support structure segment comprises at least one longitudinal carrier element, which extends in an axial direction and comprises a stator segment-sided lamination attachment section having through holes for lamination bolting means for fixing the carrier element to the respective stator segment using a lamination attachment assembly, wherein the lamination attachment assembly for each carrier element comprises:
a counter bearing element to be inserted into a cavity of the lamination stack and extending at least essentially over a complete axial length of the stator segment, the counter bearing element comprising threaded holes for receiving the lamination bolting means; and
a stiffening bar to be placed inside the carrier element on the lamination attachment section, extending at least essentially over the complete axial length of the support structure segment and comprising through holes for the lamination bolting means, and
wherein the lamination bolting means are bolted through aligned sets of through holes and threaded hole.

2. The stator according to claim 1, wherein the counter bearing element, the stiffening bar and the lamination bolting means form an at least essentially H-shaped stiffening structure extending at least essentially over a whole axial length of each support structure segment.

3. The stator according to claim 1, wherein the stiffening bar is made of metal, and/or the lamination attachment assembly further comprises at least one lamination washer for each lamination bolting means and/or a total of twenty to thirty lamination bolting means.

4. The stator according to claim 1, wherein the counter bearing element is tightly fitted into the cavity and/or each cavity has an opening towards the respective lamination attachment section, the opening having a smaller circumferential extension than a widest circumferential extension of the cavity, and/or the counter bearing element has a tapered shape towards the lamination attachment section.

5. The stator according to claim 4, wherein the counter bearing element has a dove tail-like cross section or is a half-moon rod.

6. The stator according to claim 1, wherein the monolithic carrier element has a rectangular, hollow profile, wherein access holes are provided for each lamination bolting means in an access section opposite the lamination attachment section.

7. The stator according to claim 1, wherein at least the carrier element at circumferential sides of the support structure segments comprise a segment attachment section having through holes for segment bolting means for fixing the segment attachment section to a respective segment attachment section of a circumferentially adjacent support structure segment using a segment attachment assembly, wherein the segment attachment assembly for each segment-to-segment connection comprises:
a stiffening plate placed between the two segment attachment sections, extending at least essentially over the complete axial length of the support structure segments and comprising through holes for the segment bolting means, the segment bolting means bolted through aligned sets of through holes, and nuts fixating the segment bolting means on the non-stiffening plate side of the segment attachment section opposite the segment attachment section against which a head portion of the segment bolting means rests.

8. The stator according to claim 7, wherein the segment attachment assembly further comprises a bushing enclosing the segment bolting means as a spacer between the stiffening plate, which is directly or indirectly abutting to a surface of one of the segment attachment sections, and the other segment attachment section, wherein the bushing screwed into the threaded through hole of the stiffening plate to adjust to a distance between the two support structure segments.

9. The stator according to claim 7, wherein the segment attachment section has a material thickness equal to a material thickness of a rest of the carrier element.

10. The stator according to claim 7, wherein at least one access opening is provided in a section of the carrier element opposite to the segment attachment section.

11. The stator according to claim 7, wherein the segment attachment assembly comprises at least one washer of the segment bolting means and/or four to ten segment bolting means.

12. A wind turbine generator comprising the stator according to claim 1.

13. A wind turbine comprising the generator according to claim 12.

\* \* \* \* \*